US012626165B2

(12) United States Patent
Van Der Stockt et al.

(10) Patent No.: US 12,626,165 B2
(45) Date of Patent: May 12, 2026

(54) REDUCING COMPUTATIONAL REQUIREMENTS FOR MACHINE LEARNING MODEL EXPLAINABILITY

(71) Applicant: International Business Machines Corporation, Armonk, NY (US)

(72) Inventors: Stefan A. G. Van Der Stockt, Austin, TX (US); Erika Agostinelli, Bristol (GB); Edward James Biddle, Winchester (GB); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 17/701,911

(22) Filed: Mar. 23, 2022

(65) Prior Publication Data

US 2023/0306288 A1     Sep. 28, 2023

(51) Int. Cl.
| | |
|---|---|
| *G06N 5/045* | (2023.01) |
| *G06N 5/01* | (2023.01) |
| *G06N 20/20* | (2019.01) |

(52) U.S. Cl.
CPC .............. *G06N 5/045* (2013.01); *G06N 5/01* (2023.01); *G06N 20/20* (2019.01)

(58) Field of Classification Search
CPC ........................................................ G06N 5/01
See application file for complete search history.

(56) References Cited

U.S. PATENT DOCUMENTS

| | | | |
|---|---|---|---|
| 10,831,189 | B2 | 11/2020 | Kim et al. |
| 11,055,616 | B2 | 7/2021 | Dalli et al. |
| 2019/0164057 | A1 | 5/2019 | Doshi |

| | | | | |
|---|---|---|---|---|
| 2020/0167677 | A1 | 5/2020 | Verma et al. | |
| 2020/0279140 | A1 | 9/2020 | Pai et al. | |
| 2020/0294231 | A1 | 9/2020 | Tosun et al. | |
| 2020/0372295 | A1* | 11/2020 | Jansen | ....................... G06N 3/09 |
| 2021/0004703 | A1 | 1/2021 | Zoldi et al. | |
| 2023/0196080 | A1* | 6/2023 | Farooqi | ................... G06N 3/047 706/21 |

FOREIGN PATENT DOCUMENTS

| | | |
|---|---|---|
| WO | 2020182706 A1 | 9/2020 |

OTHER PUBLICATIONS

Zhang, Deep Descriptive Clustering, May 24, 2021 (Year: 2021).*
Klaise et al., Monitoring and explainability of models in production, Workshop on Challenges in Deploying and Monitoring Machine Learning Systems (ICML 2020), Jul. 13, 2020.
Ribeiro et al., Anchors: High-precision model-agnostic explanations, AAI conference on artificial intelligence, vol. 32, No. 1, 2018.
Veiber et al., Challenges towards production-ready explainable machine learning, 2020 ,{USENIX} Conference on Operational Machine Learning (OpML 20).

* cited by examiner

*Primary Examiner* — Kamran Afshar
*Assistant Examiner* — Kyle Allman Thompson

(57) ABSTRACT

A first input transaction is classified into a first input space cluster in a set of input space clusters. It is determined that the first input space cluster maps to a single explainability space cluster in a set of explainability space clusters. Using an interpretable model corresponding to the single explainability space cluster, a first machine learning model prediction is explained, the first machine learning model prediction resulting from processing, by a machine learning model, the first input transaction.

18 Claims, 14 Drawing Sheets

*Fig. 3*

TRANSACTION DATA

300

TRAINING MODULE
310

EXPLANATION MODULE
320

TRANSACTION
EXPLANATION

310

EXPLAINABILITY ANALYSIS MODULE
410

EXPLANATION SPACE CLUSTERING MODULE
420

MODEL CONSTRUCTION MODULE
430

INPUT SPACE CLUSTERING MODULE
440

INPUT SPACE LABELLING MODULE
450

INPUT CLASSIFICATION MODULE
510

INPUT EXPLANATION MODULE
520

FEATURE CLUSTERS
730

CLUSTER 2
GENDER
P CLASS

CLUSTER 3
FARE
DECK

CLUSTER 1
GENDER
AGE
P CLASS

DECISION TREE   810

IF P CLASS = "THIRD"

IF GENDER = "MALE"

SURVIVAL = 0

IF GENDER = "FEMALE"

IF AGE <18 OR >35

SURVIVAL = 1

IF AGE >18 OR <35

SURVIVAL = 0

IF P CLASS <> "THIRD"

IF AGE < 18

IF AGE > 18

*Fig. 9*
INPUT CLUSTER MAPPING  910
| INPUT CLUSTER | EXPLANATION SPACE CLUSTERS | CLUSTER STABILITY |
|---|---|---|
| 912 | 1,2 | UNSTABLE |
| 914 | 3 | STABLE |
| 916 | 2,3 | UNSTABLE |
| 918 | 3 | STABLE |
| 920 | 1 | STABLE |
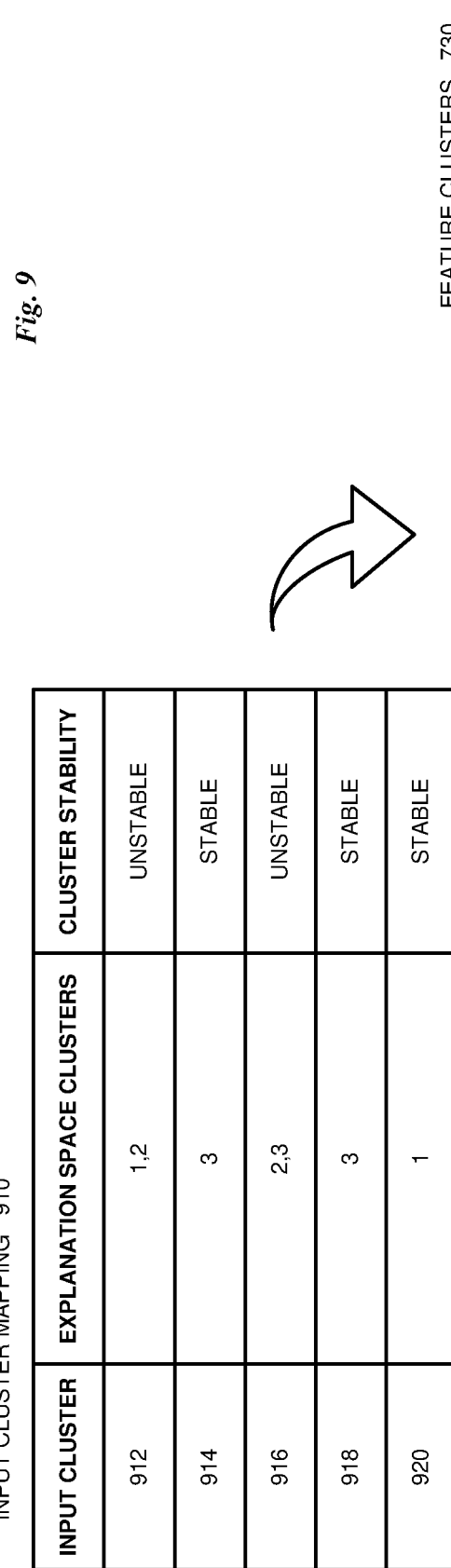
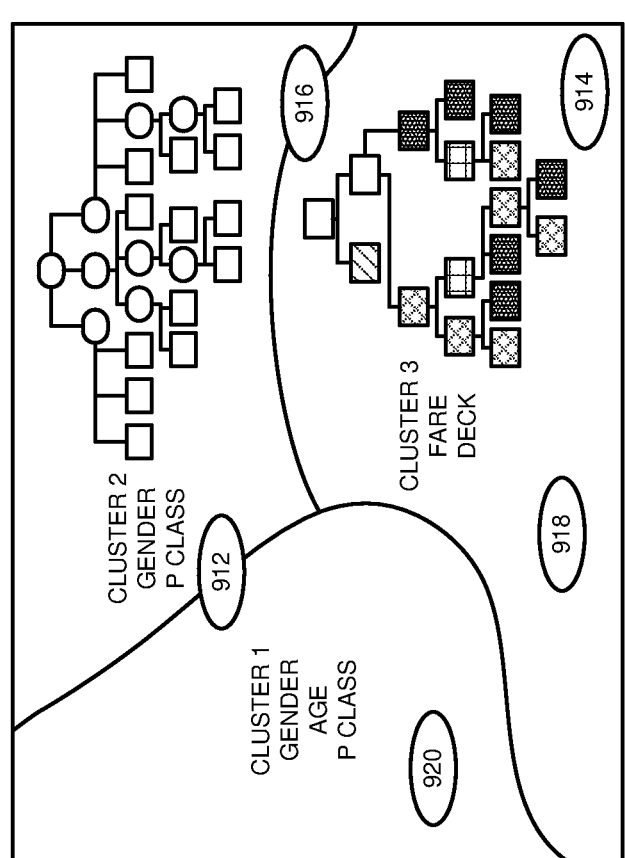
FEATURE CLUSTERS  730
CLUSTER 2
GENDER
P CLASS
CLUSTER 3
FARE
DECK
CLUSTER 1
GENDER
AGE
P CLASS
916
914
912
918
920

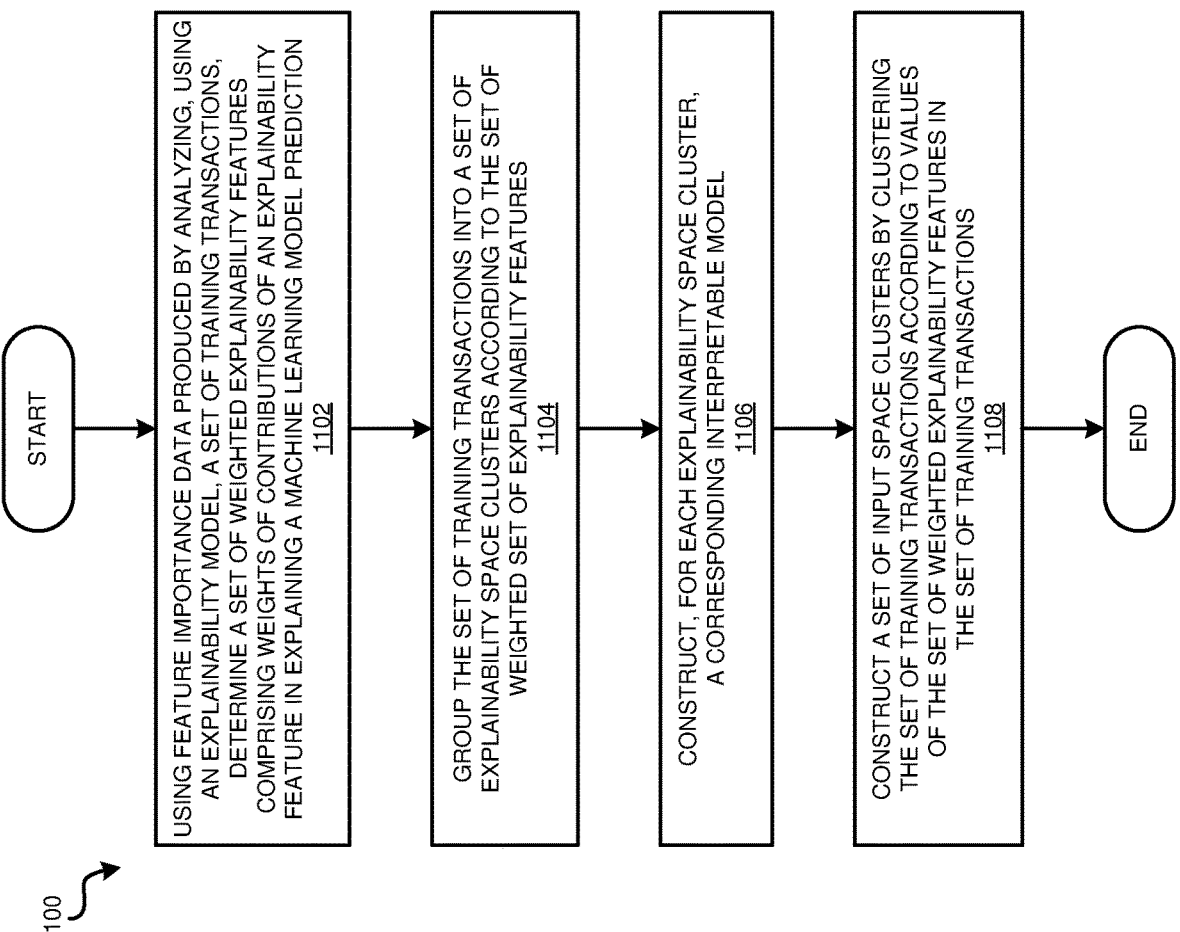

START

USING FEATURE IMPORTANCE DATA PRODUCED BY ANALYZING, USING AN EXPLAINABILITY MODEL, A SET OF TRAINING TRANSACTIONS, DETERMINE A SET OF WEIGHTED EXPLAINABILITY FEATURES COMPRISING WEIGHTS OF CONTRIBUTIONS OF AN EXPLAINABILITY FEATURE IN EXPLAINING A MACHINE LEARNING MODEL PREDICTION
1102

GROUP THE SET OF TRAINING TRANSACTIONS INTO A SET OF EXPLAINABILITY SPACE CLUSTERS ACCORDING TO THE SET OF WEIGHTED SET OF EXPLAINABILITY FEATURES
1104

CONSTRUCT, FOR EACH EXPLAINABILITY SPACE CLUSTER, A CORRESPONDING INTERPRETABLE MODEL
1106

CONSTRUCT A SET OF INPUT SPACE CLUSTERS BY CLUSTERING THE SET OF TRAINING TRANSACTIONS ACCORDING TO VALUES OF THE SET OF WEIGHTED EXPLAINABILITY FEATURES IN THE SET OF TRAINING TRANSACTIONS
1108

END

*Fig. 12*

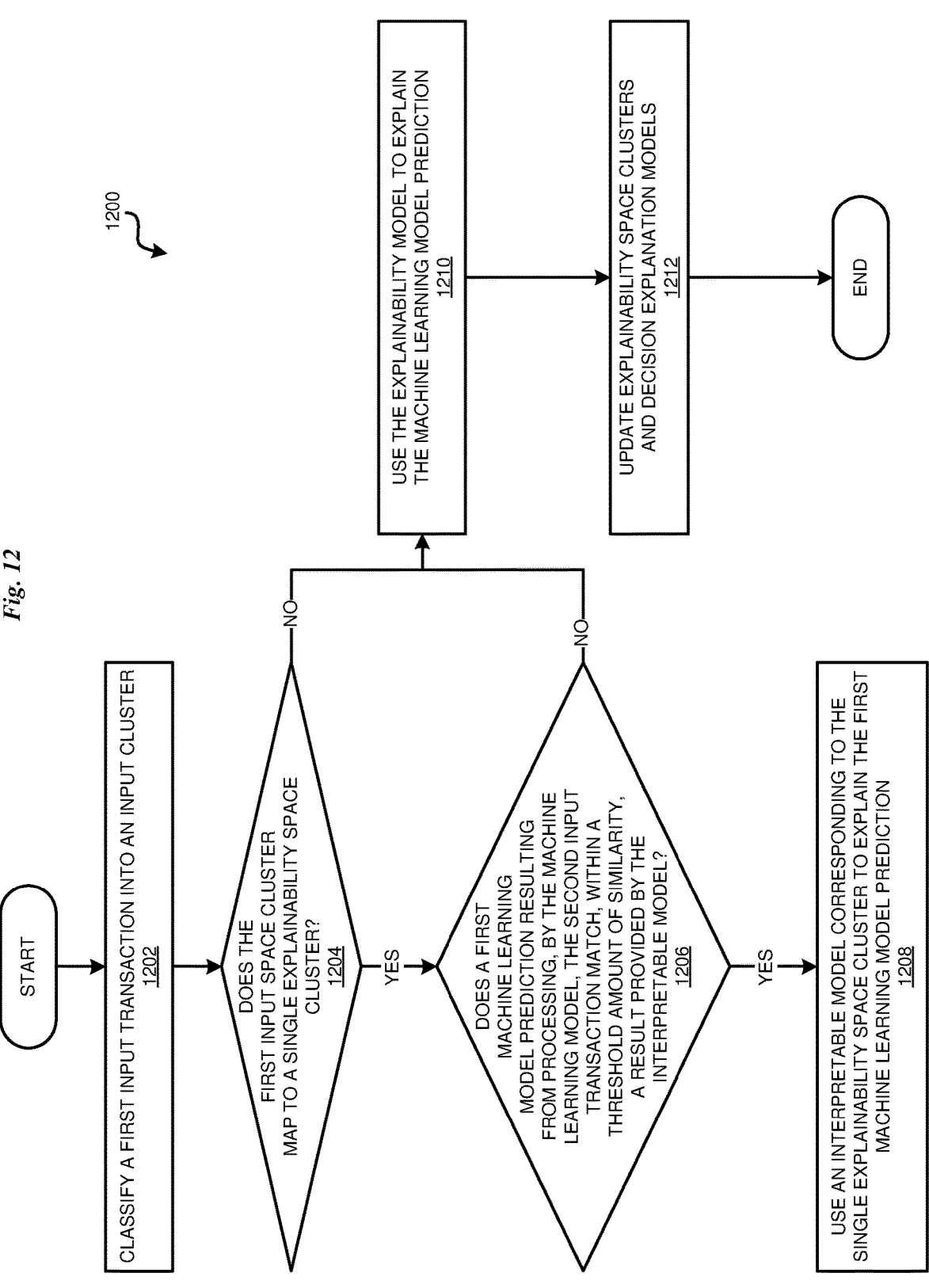

1200

START

CLASSIFY A FIRST INPUT TRANSACTION INTO AN INPUT CLUSTER
1202

DOES THE FIRST INPUT SPACE CLUSTER MAP TO A SINGLE EXPLAINABILITY SPACE CLUSTER?
1204

NO → USE THE EXPLAINABILITY MODEL TO EXPLAIN THE MACHINE LEARNING MODEL PREDICTION
1210

YES

DOES A FIRST MACHINE LEARNING MODEL PREDICTION RESULTING FROM PROCESSING, BY THE MACHINE LEARNING MODEL, THE SECOND INPUT TRANSACTION MATCH, WITHIN A THRESHOLD AMOUNT OF SIMILARITY, A RESULT PROVIDED BY THE INTERPRETABLE MODEL?
1206

NO → UPDATE EXPLAINABILITY SPACE CLUSTERS AND DECISION EXPLANATION MODELS
1212

END

YES

USE AN INTERPRETABLE MODEL CORRESPONDING TO THE SINGLE EXPLAINABILITY SPACE CLUSTER TO EXPLAIN THE FIRST MACHINE LEARNING MODEL PREDICTION
1208

REDUCING COMPUTATIONAL REQUIREMENTS FOR MACHINE LEARNING MODEL EXPLAINABILITY

BACKGROUND

The present invention relates generally to a method, system, and computer program product implementing machine learning model explainability. More particularly, the present invention relates to a method, system, and computer program product for reducing computational requirements for machine learning model explainability.

A machine learning model is a model trained on training data to make predictions or decisions without being explicitly programmed with a set of rules. Instead, the model learns from the training data. In machine learning, a feature is an individual measurable property or characteristic of a phenomenon. A feature is also a data attribute. A machine learning model is said to produce a result, or prediction, from a set of input feature data. The combination of the set of input feature data and the corresponding model output is also called a transaction. For example, one well-known dataset used in machine learning experiments predicts whether or not a passenger survived the sinking of the Titanic using input features such as the passenger's gender, age, the class of the passenger's ticket, where the passenger embarked from, the fare paid, the deck where the passenger's cabin was, and the passenger's ticket number. The model's prediction can then be checked against the passenger's actual result.

Because machine learning models learn from training data, the models typically provide results, but do not articulate how a model came to a specific result. However, understanding how a model came to a specific result—also called model explainability—helps ensure that the system continues to perform as expected, even if production data differs from the original training data. Model evaluation also helps a business compare model predictions, quantify model risk, and optimize model performance. Model explainability is also important in promoting user trust in the model's results, and helps those affected by a decision to challenge or change that outcome. Model explainability also helps mitigate compliance, legal, security, and reputational risks of model use, and might be necessary to meet regulatory standards or guidelines. For example, consider a machine learning model configured to predict whether or not to approve a loan to a borrower. Borrowers who are not approved will want to understand why. The lending institution will want to ensure that its model is accurate, so that borrowers who are approved actually pay their loans back. There may also be compliance, reputational, legal, and regulatory requirements associated with particular loan decisions.

SUMMARY

The illustrative embodiments provide a method, system, and computer program product. An embodiment includes a method that classifies, into a first input space cluster in a set of input space clusters, a first input transaction. An embodiment determines that the first input space cluster maps to a single explainability space cluster in a set of explainability space clusters. An embodiment explains, using an interpretable model corresponding to the single explainability space cluster, a first machine learning model prediction, the first machine learning model prediction resulting from processing, by a machine learning model, the first input transaction.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for reducing computational requirements for machine learning model explainability in accordance with an illustrative embodiment;

FIG. 5 depicts a block diagram of an example configuration for reducing computational requirements for machine learning model explainability in accordance with an illustrative embodiment;

FIG. 9 depicts a continued example of reducing computational requirements for machine learning model explainability in accordance with an illustrative embodiment;

FIG. 11 depicts a flowchart of an example process for reducing computational requirements for machine learning model explainability in accordance with an illustrative embodiment;

FIG. 12 depicts a flowchart of an example process for reducing computational requirements for machine learning model explainability in accordance with an illustrative embodiment;

DETAILED DESCRIPTION

Figure 1:
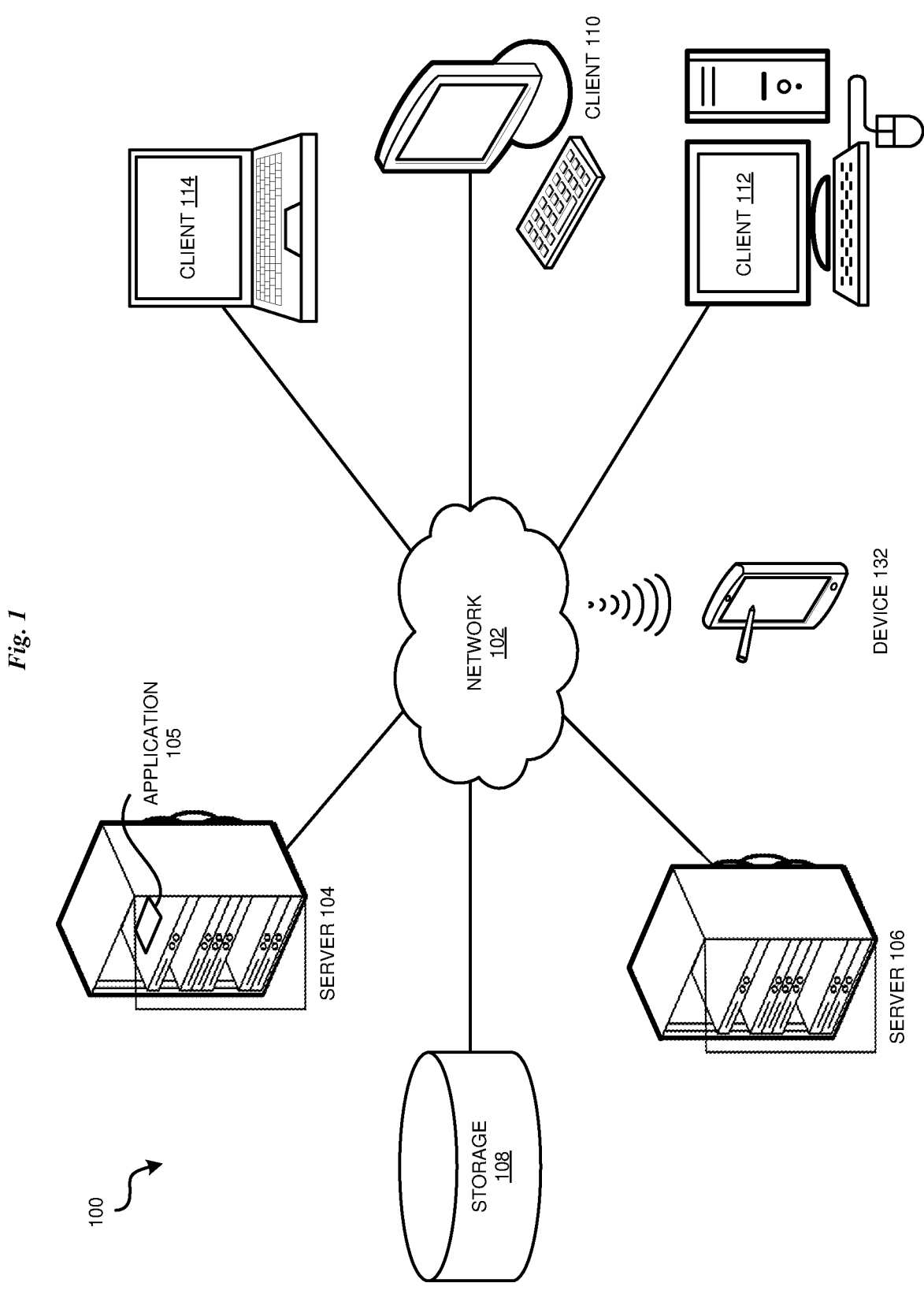
FIG. 1 depicts a block diagram of a network of data processing systems in which illustrative embodiments may be implemented.

The illustrative embodiments recognize that machine learning model explainability is important, for the reasons discussed herein. However, calculating explainability for any specific transaction is a computationally intensive task. For example, local interpretable model-agnostic explanations (LIME), one presently known open-source algorithm that is the de facto standard in providing explainable model results, requires, by default, approximately 5,000 extra model evaluations to determine feature importance and hence explain one model transaction. Shapley Additive exPlanations (SHAP), another presently known explainability algorithm, produces overall model explainability, but is also very computationally intensive. Thus, even a few requests to explain a small number of transactions can be enough to adversely affect an entire model serving infrastructure, due to the computational requirements for performing the requests. Presently known algorithms' computation requirements are further magnified when each model output (not just a sampling) must be both obtained and explained, in real time, creating implementation difficulties including feasibility, cost, and latency. Thus, the load created by explainability requests vastly exceeds available compute resources to perform the explanations. Thus, the illustrative embodiments recognize that there is an unmet need to reduce the computational cost of explaining a machine learning model result, while still providing correct results and explanations.

The illustrative embodiments recognize that the presently available tools or solutions do not address these needs or provide adequate solutions for these needs. The illustrative embodiments used to describe the invention generally address and solve the above-described problems and other problems related to reducing computational requirements for machine learning model explainability.

An embodiment can be implemented as a software application. The application implementing an embodiment can be configured as a modification of an existing machine learning model explainability system, as a separate application that operates in conjunction with an existing machine learning model explainability system, a standalone application, or some combination thereof.

Particularly, some illustrative embodiments provide a method that classifies a first input transaction into a first input space cluster in a set of input space clusters, determines that the first input space cluster maps to a single explainability space cluster in a set of explainability space clusters, and explains, using an interpretable model corresponding to the single explainability space cluster, a first machine learning model prediction resulting from processing, by a machine learning model, the first input transaction.

An embodiment receives a set of training transaction data with which to construct an explainability cache, a cache of explanations for model results that can be used to avoid recomputing explanations when possible. Each transaction includes input data from which a machine learning model is to predict a result, as well as the predicted result. As a running example, consider the Titanic dataset, in which each transaction includes data of the passenger's gender, age, the class of the passenger's ticket, where the passenger embarked from, the fare paid, the deck where the passenger's cabin was, the passenger's ticket number, as well as whether or not the passenger survived. The passenger's ticket number serves as a unique label for each transaction.

An embodiment uses an explainability model to perform an explainability analysis on transactions in the set of training transaction data. Techniques for performing an explainability analysis, such as LIME and SHAP, are presently known. An embodiment uses feature importance data produced by the explainability analysis to construct a superset of the most important features, within the input data of a transaction, in explaining a machine learning model's output for that transaction. The most important, or most influential, features are features that have above a threshold weight, or influence, on the model's output. Thus, one embodiment includes all features that have above the threshold weight. Another embodiment includes only a subset of the features that have above the threshold weight, for example the top five or ten features that have above the threshold weight. In one embodiment, the threshold is eighty percent. Other threshold values, and other values for the number of features included in the set of most important features, are also possible and contemplated within the scope of the illustrative embodiments. One embodiment constructs a matrix, in which columns denote each of set of most important features, rows denote data for a transaction, and each row-column intersection stores weights in a 0-1 range. Each weight is a percentage of influence of a feature in a particular transaction.

Continuing the Titanic example, assume explainability analysis on the passengers' ticket transactions determines that the most important features are the passenger's gender, age, the class of the passenger's ticket, the fare paid, and the deck where the passenger's cabin was. Thus, an embodiment constructs a matrix in which columns denote the passenger's gender, age, the class of the passenger's ticket, the fare paid, and the deck where the passenger's cabin was, rows denote data for a particular passenger, and each row-column intersection stores weights in a 0-1 range denoting a weight of a feature on a particular passenger's outcome.

An embodiment groups transactions into a set of clusters, in an explanation space, according to the weights of the set of most important features for each transaction. As a result, each cluster contains transactions that are as alike as possible with respect to the features that were important in producing a particular result for the transactions. To perform the clustering, an embodiment uses a presently available clustering technique, for example agglomerative clustering or k-means clustering.

Continuing the Titanic example, assume the passenger transactions have been grouped into three clusters. In cluster 1 the strongest features are the passenger's gender, age, and the class of the passenger's ticket. In cluster 2 the strongest features are the passenger's gender and the class of the passenger's ticket. In cluster 3 the strongest features are the fare paid, and the deck where the passenger's cabin was.

An embodiment uses the results of the explainability analysis on transactions within a cluster to construct an interpretable model describing decision boundaries for transactions within that cluster. An interpretable model is a model that provides both a result and an interpretation, or explanation, for the provided result. In other words, an interpretable model is not a black box. One non-limiting example of an interpretable model describing decision boundaries is a decision tree, a flowchart-like structure in which each internal node represents a test on a feature, each branch represents the outcome of the test, and each leaf node represents an outcome that is the result of computing all the tests. The paths from root to leaf represent classification rules.

Continuing the Titanic example, in cluster 1 the strongest features are the passenger's gender, age, and the class of the passenger's ticket. Thus, a root node in a decision tree describing decision boundaries for cluster 1 might test whether the class of the passenger's ticket was third class or not. If the class of the passenger's ticket was third class, a branch node might test the passenger's gender, and if the passenger was female another branch node might test an age range for the passenger. Thus, arriving at a set of leaf nodes, the sequence of tests might indicate that a male passenger with a third class ticket did not survive, while a female passenger with a third class ticket who was younger than 18 or older than 35 did survive—thus explaining a transaction result (survival or not) for those passengers.

An embodiment groups training transactions into a second set of clusters, in an input space, according to values of the set of weighted explainability features in the training transactions. As a result, each input cluster contains transactions that are as alike as possible. To perform the clustering, an embodiment uses a presently available clustering technique, for example agglomerative or k-means clustering.

An embodiment maps the input space clusters to the clusters within the explanation space (explanation space clusters), according to a degree of overlap between the features characterizing an explanation space cluster and the features characterizing an input space cluster. If the features characterizing an explanation space cluster and the features characterizing an input space cluster are the same (a complete overlap), an input space cluster falls entirely within one explanation space cluster. That input space cluster is labelled as stable and that explanation space cluster's interpretable model is a candidate for explaining transactions in that input space cluster. If the features characterizing an explanation space cluster and the features characterizing an input space cluster are not all the same (an incomplete or no overlap), an input space cluster falls within more than one explanation space cluster. That input space cluster is labelled as unstable and no interpretable model is a candidate for explaining transactions in that input space cluster.

Continuing the Titanic example, assume the transactions cluster into five input space clusters. Some input space clusters fall entirely within one explanation space cluster, and that explanation space cluster's interpretable model is a candidate for explaining transactions in those input space clusters. Other input space clusters fall within more than one explanation space cluster, and no interpretable model is a candidate for explaining transactions in those input space clusters.

An embodiment stores input space clusters and interpretable models corresponding to explanation space clusters in an explainability cache. Once interpretable models are in the explainability cache, an embodiment is ready to use data in the explainability cache to process new transaction data. In particular, for an input transaction, an embodiment determines which input space cluster the transaction data is most similar to within the input space. To determine similarity to an input space cluster, one embodiment uses the same similarity or distance metric used to perform the input space clustering. If the selected input cluster is labelled as unstable (i.e., falls within more than one explanation space cluster), an embodiment uses the machine learning model is to predict a result for the transaction, and uses a presently available explainability model to explain the model's predicted result. An embodiment also adds the transaction's input data, predicted result, and explanation to a set of training transaction data usable for explainability cache adjustment and refinement in a manner described herein. If the selected input cluster is labelled as stable (i.e., falls within only one explanation space cluster), an embodiment compares the machine learning model predicted result for the transaction with a result output of the explanation space cluster's interpretable model. If the two results are congruent (i.e., matching each other within a threshold amount of similarity), the interpretable model's explanation is valid and an embodiment uses the explanation space's interpretable model to explain the transaction. Using the explanation space's interpretable model to explain the transaction requires much less computation than executing a presently available explainability technique. However, if the two results are incongruent, the interpretable model's explanation is not valid. In this case, an embodiment uses the machine learning model is to predict a result for the transaction, and uses a presently available explainability model to explain the model's predicted result. An embodiment also adds the transaction's input data, predicted result, and explanation to a set of training transaction data usable for explainability cache adjustment and refinement in a manner described herein. Thus, over time the percentage of input transactions explainable using a cluster's interpretable model explanation will increase and the percentage of input transactions requiring a presently available explainability technique, with its associated computation cost, will decrease.

Continuing the Titanic example, if a new transaction maps to a stable input cluster and the machine learning model's predicted result for the transaction is congruent with the output of the explanation space cluster's interpretable model, an embodiment uses the interpretable model to explain the predicted result for the transaction. Otherwise, the embodiment uses a presently available explainability model to explain the model's predicted result.

The manner of reducing computational requirements for machine learning model explainability described herein is unavailable in the presently available methods in the technological field of endeavor pertaining to machine learning model explainability. A method of an embodiment described herein, when implemented to execute on a device or data processing system, comprises substantial advancement of the functionality of that device or data processing system in classifying a first input transaction into a first input space cluster in a set of input space clusters, determining that the first input space cluster maps to a single explainability space cluster in a set of explainability space clusters, and explaining, using an interpretable model corresponding to the single explainability space cluster, a first machine learning model prediction resulting from processing, by a machine learning model, the first input transaction.

The illustrative embodiments are described with respect to certain types of transactions, machine learning models, explainability models, explainability features, clusters, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
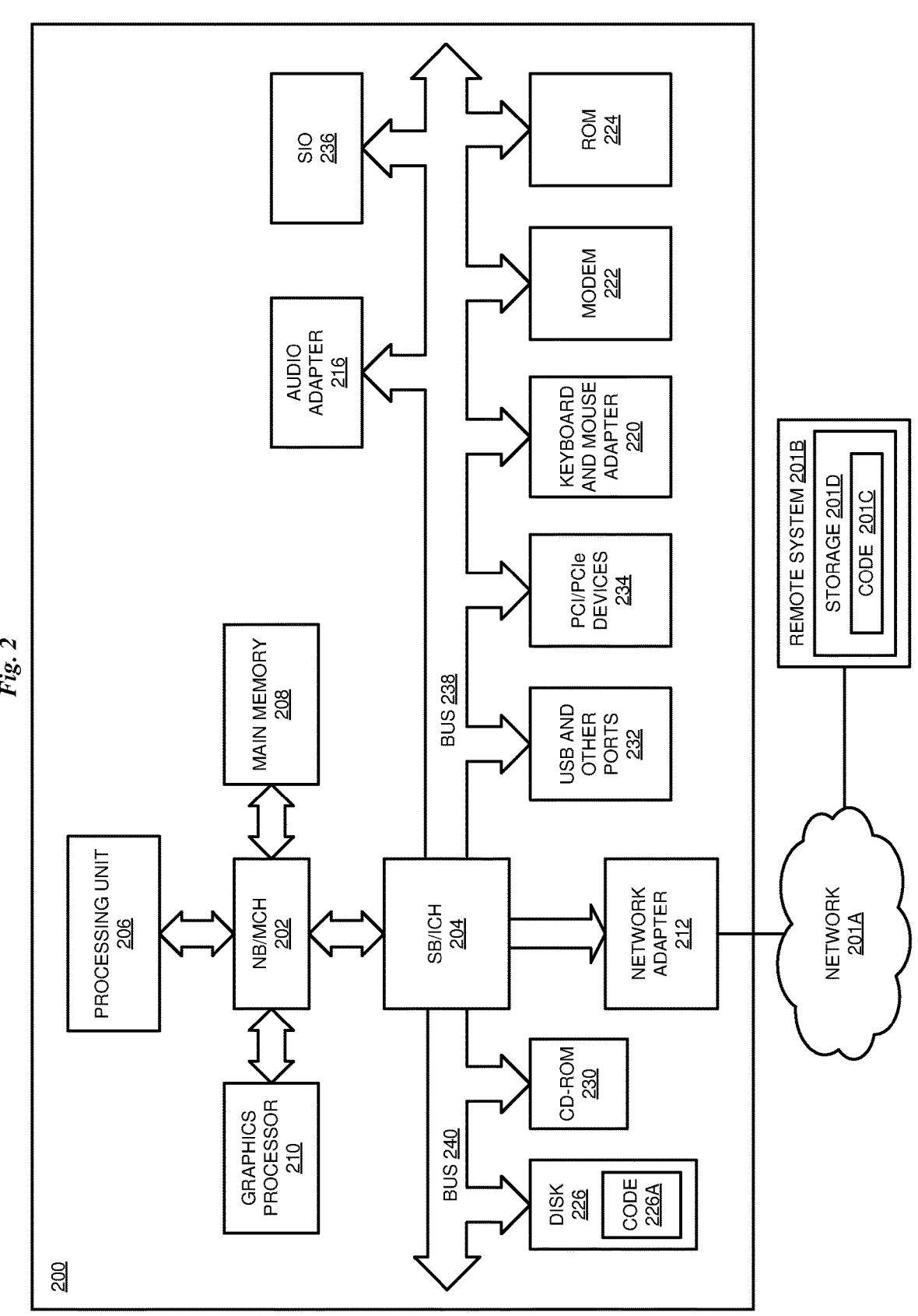
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
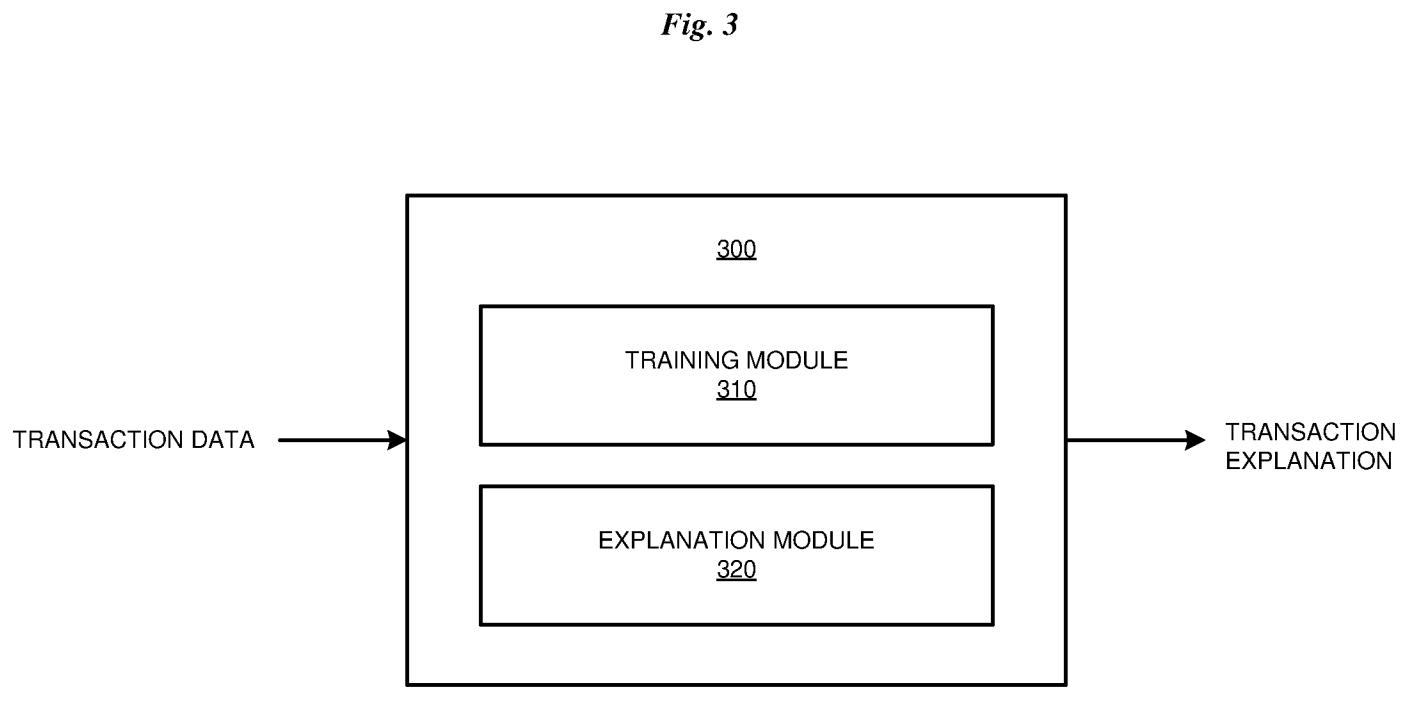

With reference to FIG. 3, this figure depicts a block diagram of an example configuration for reducing computational requirements for machine learning model explainability in accordance with an illustrative embodiment. Application 300 is an example of application 105 in FIG. 1 and executes in any of servers 104 and 106, clients 110, 112, and 114, and device 132 in FIG. 1.

Application 300 receives a set of training transaction data with which to construct an explainability cache, a cache of explanations for model results that can be used to avoid recomputing explanations when possible. Each transaction includes input data from which a machine learning model is to predict a result, as well as the predicted result. Training module 310 constructs an explainability cache. More detail of training module 310 is provided in the description of FIG. 4 herein.

Explanation module 320 produces explanations for input transaction data, using the explainability cache when possible. More detail of explanation module 320 is provided in the description of FIG. 5 herein.

Figure 4:
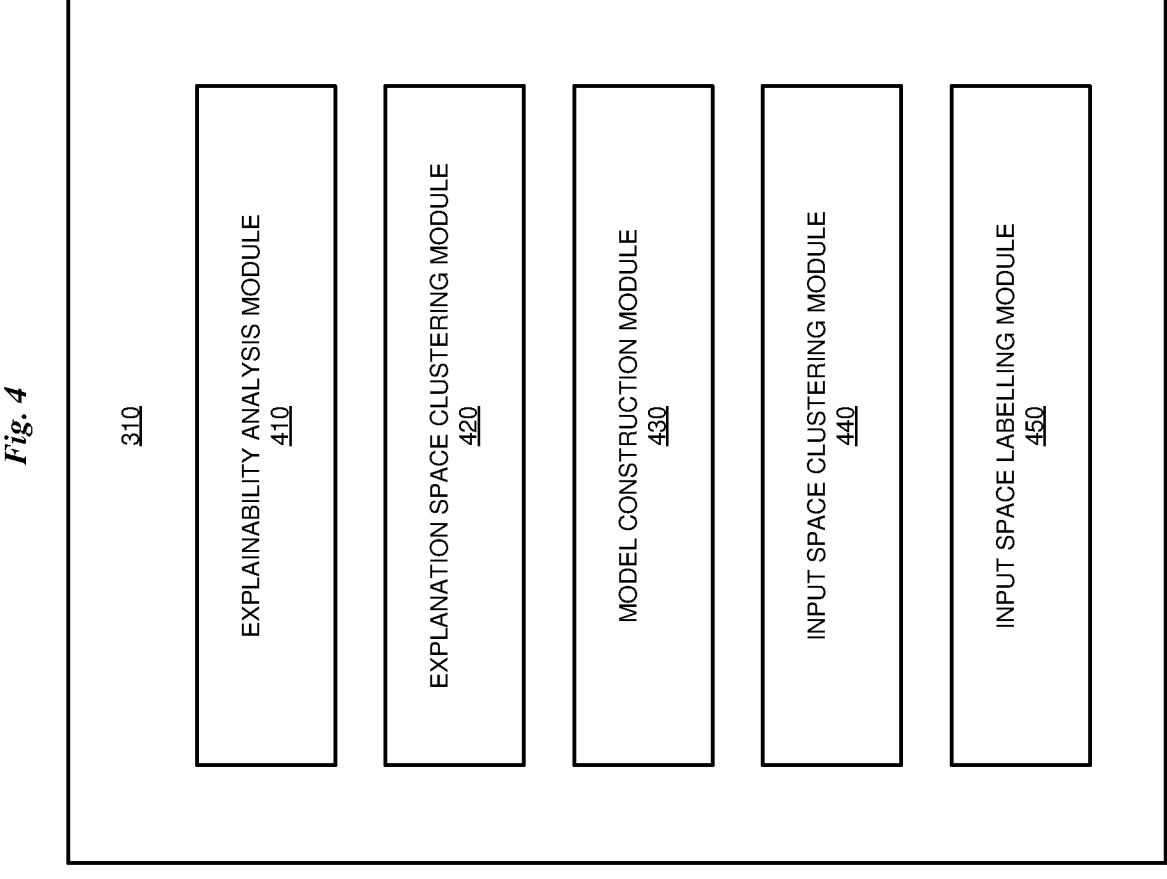
FIG. 4 depicts a block diagram of an example configuration for reducing computational requirements for machine learning model explainability in accordance with an illustrative embodiment.

With reference to FIG. 4, this figure depicts a block diagram of an example configuration for reducing computational requirements for machine learning model explainability in accordance with an illustrative embodiment. In particular, FIG. 4 depicts more detail of training module 310 in FIG. 3.

Explainability analysis module 410 uses an explainability model to perform an explainability analysis on transactions in the set of training transaction data. Module 410 uses feature importance data produced by the explainability analysis to construct a superset of the most important features, within the input data of a transaction, in explaining a machine learning model's output for that transaction. The most important, or most influential, features are features that have above a threshold weight, or influence, on the model's output. Thus, one implementation of module 410 includes all features that have above the threshold weight. Another implementation of module 410 includes only a subset of the features that have above the threshold weight, for example the top five or ten features that have above the threshold weight. In one implementation of module 410, the threshold is eighty percent. One implementation of module 410 constructs a matrix, in which columns denote each of set of most important features, rows denote data for a transaction, and each row-column intersection stores weights in a 0-1 range. Each weight is a percentage of influence of a feature in a particular transaction.

Explanation space clustering module 420 groups transactions into a set of clusters, in an explanation space, according to the weights of the set of most important features for each transaction. As a result, each cluster contains transactions that are as alike as possible with respect to the features that were important in producing a particular result for the transactions. To perform the clustering, module 420 uses a presently available clustering technique, for example the agglomerative clustering technique.

Model construction module 430 uses the results of the explainability analysis on transactions within a cluster to construct an interpretable model describing decision boundaries for transactions within that cluster. One non-limiting example of an interpretable model describing decision boundaries is a decision tree.

Input space clustering module 440 groups training transactions into a second set of clusters, in an input space, according to values of the set of weighted explainability features in the training transactions. As a result, each input cluster contains transactions that are as alike as possible. To perform the clustering, module 440 uses a presently available clustering technique, for example the agglomerative clustering technique.

Input space labelling module 450 maps the input space clusters to the clusters within the explanation space (explanation space clusters), according to a degree of overlap between the features characterizing an explanation space cluster and the features characterizing an input space cluster. If the features characterizing an explanation space cluster and the features characterizing an input space cluster are all the same (a complete overlap), an input space cluster falls entirely within one explanation space cluster. That input space cluster is labelled as stable and that explanation space cluster's interpretable model is a candidate for explaining transactions in that input space cluster. If the features characterizing an explanation space cluster and the features characterizing an input space cluster are not all the same (an incomplete or no overlap), an input space cluster falls within more than one explanation space cluster. That input space cluster is labelled as unstable and no interpretable model is a candidate for explaining transactions in that input space cluster.

Figure 5:
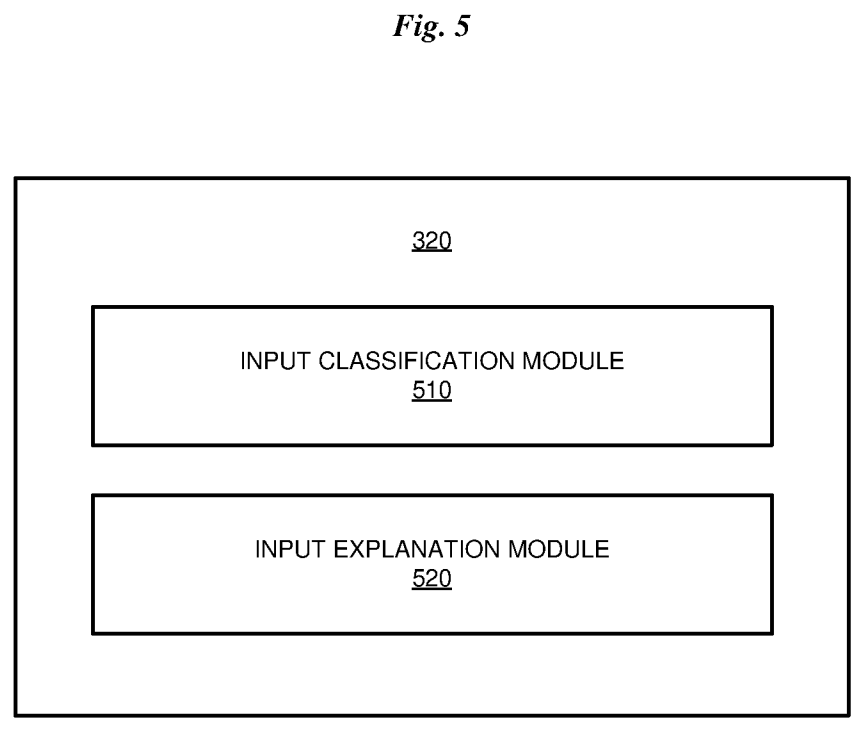

With reference to FIG. 5, this figure depicts a block diagram of an example configuration for reducing computational requirements for machine learning model explainability in accordance with an illustrative embodiment. In particular, FIG. 5 depicts more detail of training module 320 in FIG. 3.

Input classification module 510 determines which input space cluster the transaction data is most similar to within the input space. To determine similarity to an input space cluster, one implementation of module 510 uses the same similarity or distance metric used to perform the input space clustering.

If the selected input cluster is labelled as unstable (i.e., falls within more than one explanation space cluster), input explanation module 520 uses the machine learning model is to predict a result for the transaction, and uses a presently available explainability model to explain the model's predicted result. Module 520 also adds the transaction's input data, predicted result, and explanation to a set of training transaction data usable for explainability cache adjustment and refinement in a manner described herein. If the selected input cluster is labelled as stable (i.e., falls within only one explanation space cluster), module 520 compares the machine learning model predicted result for the transaction with a result output of the explanation space cluster's interpretable model. If the two results are congruent (i.e., matching each other within a threshold amount of similarity), the interpretable model's explanation is valid and module 520 uses the explanation space's interpretable model to explain the transaction. Using the explanation space's interpretable model to explain the transaction requires much less computation than executing a presently available explainability technique. However, if the two results are incongruent, the interpretable model's explanation is not valid. In this case, module 520 uses the machine learning model is to predict a result for the transaction, and uses a presently available explainability model to explain the model's predicted result. Application 300 also adds the transaction's input data, predicted result, and explanation to a set of training transaction data usable for explainability cache adjustment and refinement in a manner described herein.

Figure 6:
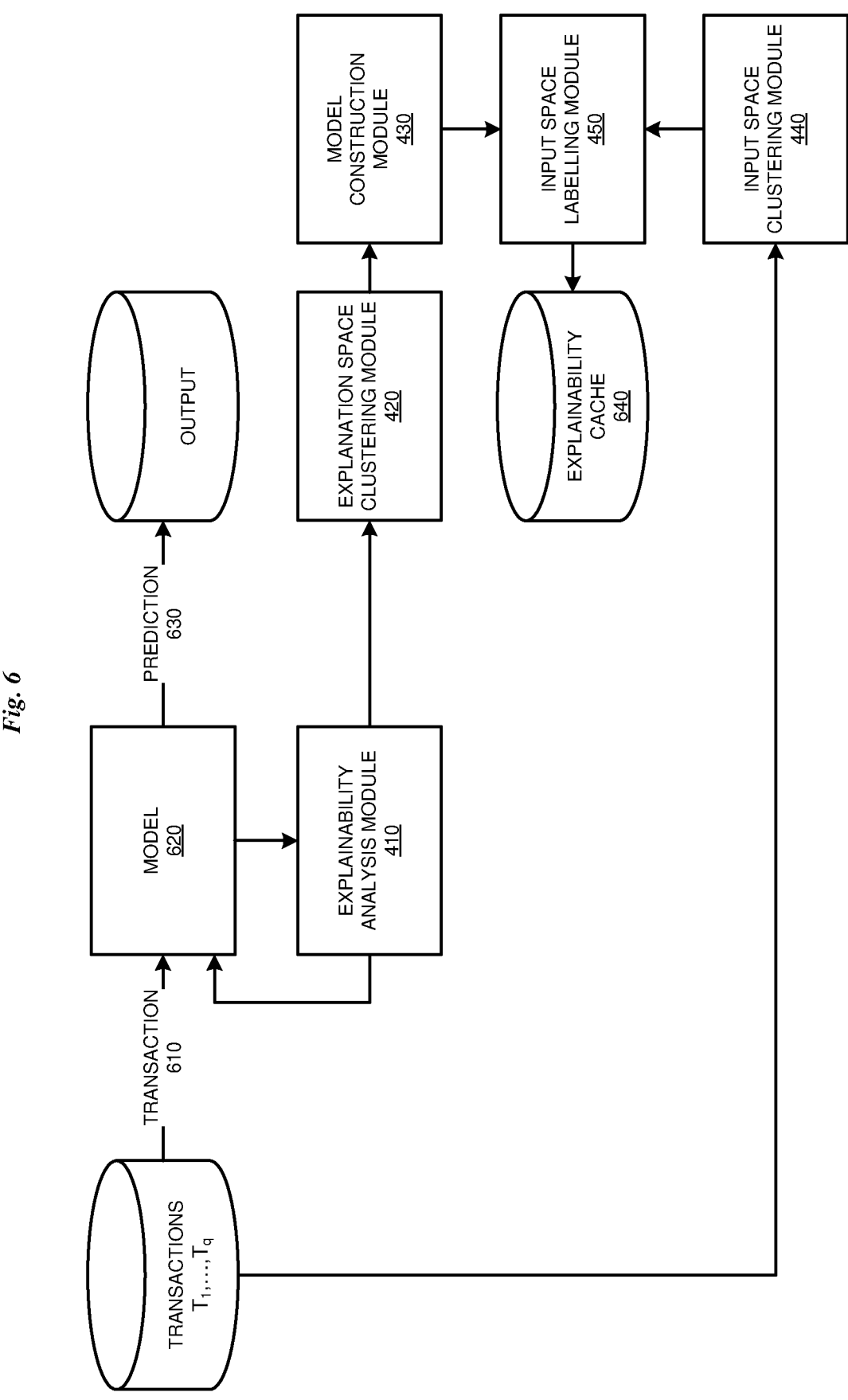
FIG. 6 depicts data flow of an example configuration for reducing computational requirements for machine learning model explainability in accordance with an illustrative embodiment.

With reference to FIG. 6, this figure depicts data flow of an example configuration for reducing computational requirements for machine learning model explainability in accordance with an illustrative embodiment. Explainability analysis module 410, explanation space clustering module 420, model construction module 430, input space clustering module 440, and input space labelling module 450 are the same as explainability analysis module 410, explanation space clustering module 420, model construction module 430, input space clustering module 440, and input space labelling module 450 in FIG. 4.

Explainability analysis module 410 uses an explainability model to perform an explainability analysis on transactions 610, from a set of training transaction data. Model 620 is a machine learning model producing predictions 630 from transactions 610. Module 410 uses feature importance data produced by the explainability analysis to construct a superset of the most important features, within the input data of a transaction, in explaining predictions 610.

Explanation space clustering module 420 groups transactions 610 into a set of clusters, in an explanation space, according to the weights of the set of most important features for each transaction. Model construction module 430 uses the results of the explainability analysis on transactions within a cluster to construct an interpretable model describing decision boundaries for transactions within that cluster. Input space clustering module 440 groups transactions 610 into a second set of clusters, in an input space, according to values of the set of weighted explainability features in the training transactions. Input space labelling module 450 maps the input space clusters to the clusters within the explanation space (explanation space clusters), and labels the input space clusters as stable or unstable. The results are stored in explainability cache 640.

Figure 7:
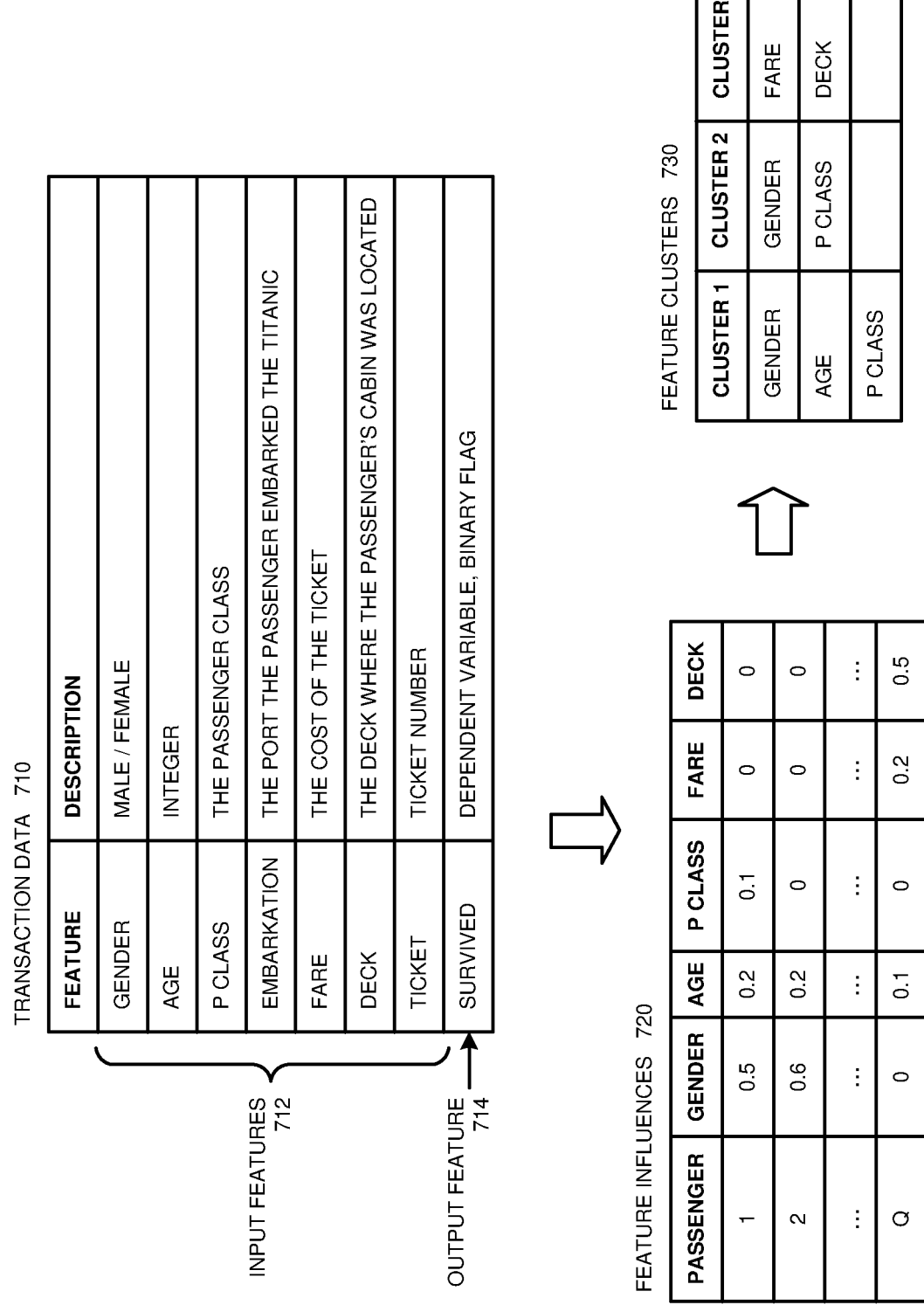
FIG. 7 depicts an example of reducing computational requirements for machine learning model explainability in accordance with an illustrative embodiment.

With reference to FIG. 7, this figure depicts an example of reducing computational requirements for machine learning model explainability in accordance with an illustrative embodiment. The example can be executed using application 300 in FIG. 3.

Transaction data 710 depicts a set of transactions from the Titanic dataset, in which each transaction includes input features 712: data of the passenger's gender, age, the class of the passenger's ticket, where the passenger embarked from, the fare paid, the deck where the passenger's cabin was, and the passenger's ticket number. Transaction data 710 also includes output feature 714: whether or not the passenger survived. The passenger's ticket number serves as a unique label for each transaction.

Application 300 uses an explainability model to perform an explainability analysis on transactions in the set of training transaction data. The most important, or most influential, features are features that have above a threshold weight, or influence, on the model's output. The results are depicted in feature influences 720, a matrix in which columns denote the passenger's gender, age, the class of the passenger's ticket, the fare paid, and the deck where the passenger's cabin was, rows denote data for a particular passenger, and each row-column intersection stores weights in a 0-1 range denoting a weight of a feature on a particular passenger's outcome.

Application 300 groups transactions into a set of clusters, in an explanation space, according to the weights of the set of most important features for each transaction. The results are depicted in feature clusters 730. In cluster 1 the strongest features are the passenger's gender, age, and the class of the passenger's ticket. In cluster 2 the strongest features are the passenger's gender and the class of the passenger's ticket. In cluster 3 the strongest features are the fare paid, and the deck where the passenger's cabin was.

Figure 8:
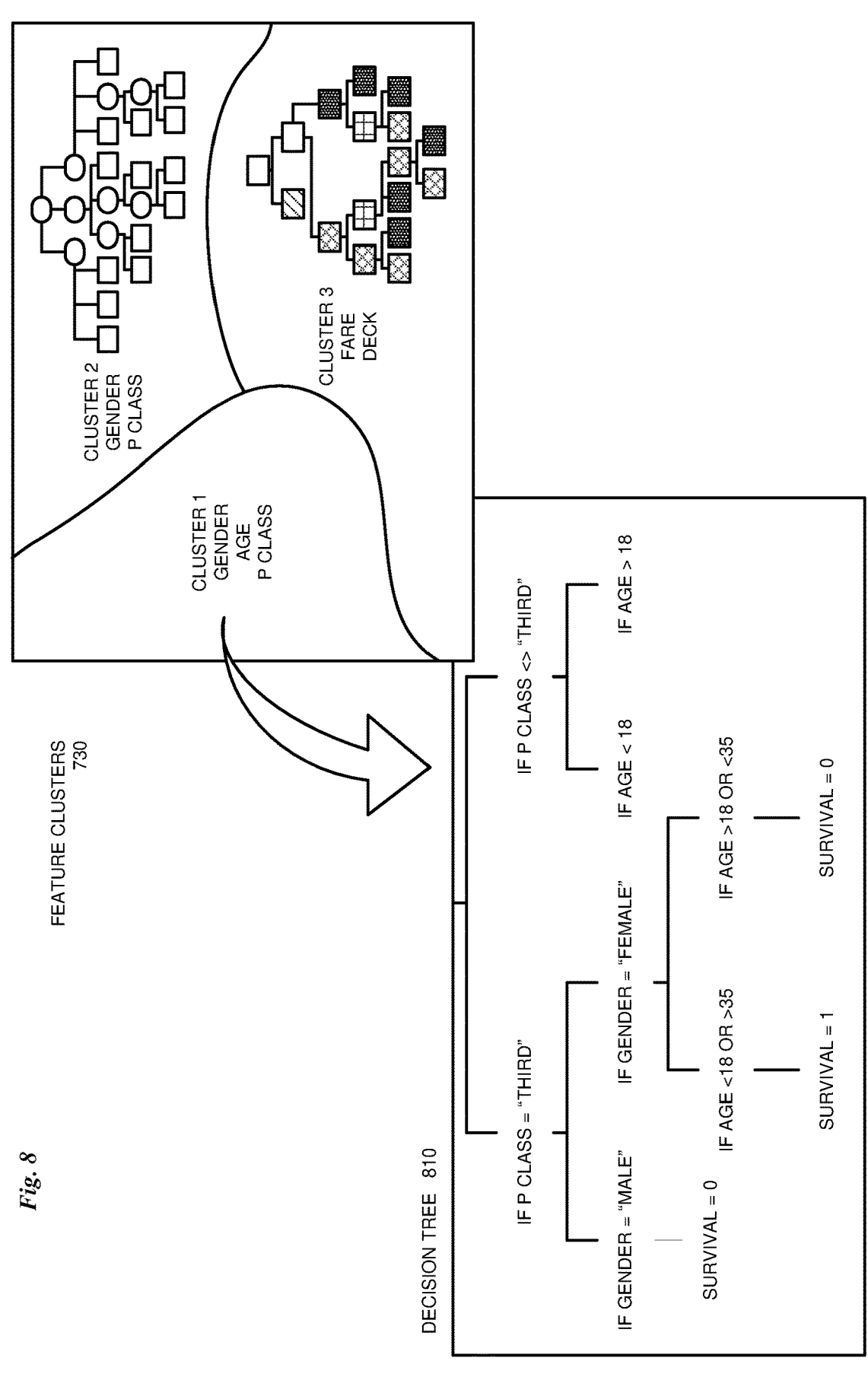
FIG. 8 depicts a continued example of reducing computational requirements for machine learning model explainability in accordance with an illustrative embodiment.

With reference to FIG. 8, this figure depicts a continued example of reducing computational requirements for machine learning model explainability in accordance with an illustrative embodiment. Feature clusters 730 are the same as feature clusters 730 in FIG. 7, depicted along with schematic representations of each cluster's corresponding interpretable model.

Application 300 uses the results of the explainability analysis on transactions within a cluster to construct an interpretable model describing decision boundaries for transactions within that cluster. In particular, decision tree 810 is an interpretable model describing decision boundaries for transactions within cluster 1 in feature clusters 730. Each internal node in decision tree 810 represents a test on a feature, each branch represents the outcome of the test, and each leaf node represents an outcome that is the result of computing all the tests. The paths from root to leaf represent classification rules. In cluster 1 the strongest features are the passenger's gender, age, and the class of the passenger's ticket. Thus, a root node in decision tree 810 describing decision boundaries for cluster 1 might test whether the class of the passenger's ticket was third class or not. If the class of the passenger's ticket was third class, a branch node might test the passenger's gender, and if the passenger was female another branch node might test an age range for the passenger. Thus, arriving at a set of leaf nodes, the sequence of tests might indicate that a male passenger with a third class ticket did not survive, while a female passenger with a third class ticket who was younger than 18 or older than 35 did survive—thus explaining a transaction result (survival or not) for those passengers.

With reference to FIG. 9, this figure depicts a continued example of reducing computational requirements for machine learning model explainability in accordance with an illustrative embodiment. Feature clusters 730 are the same as feature clusters 730 in FIG. 8.

Application 300 groups training transactions into a second set of clusters, in an input space, according to values of the set of weighted explainability features in the training transactions. Application 300 maps the input space clusters to the clusters within the explanation space (explanation space clusters). If an input space cluster falls entirely within one explanation space cluster, that input space cluster is labelled as stable and that explanation space cluster's interpretable model is a candidate for explaining transactions in that input space cluster. If an input space cluster falls within more than one explanation space cluster, that input space cluster is labelled as unstable and no interpretable model is a candidate for explaining transactions in that input space cluster. The results are depicted in input cluster mapping 910, depicting mappings and status for input clusters 912, 914, 916, 918, and 920. Input clusters 912, 914, 916, 918, and 920 are also depicted as mapped onto feature clusters 730, in which stable input clusters 914, 918, and 920 are entirely within a feature cluster and unstable input clusters 912 and 916 cross feature cluster boundaries.

Figure 10:
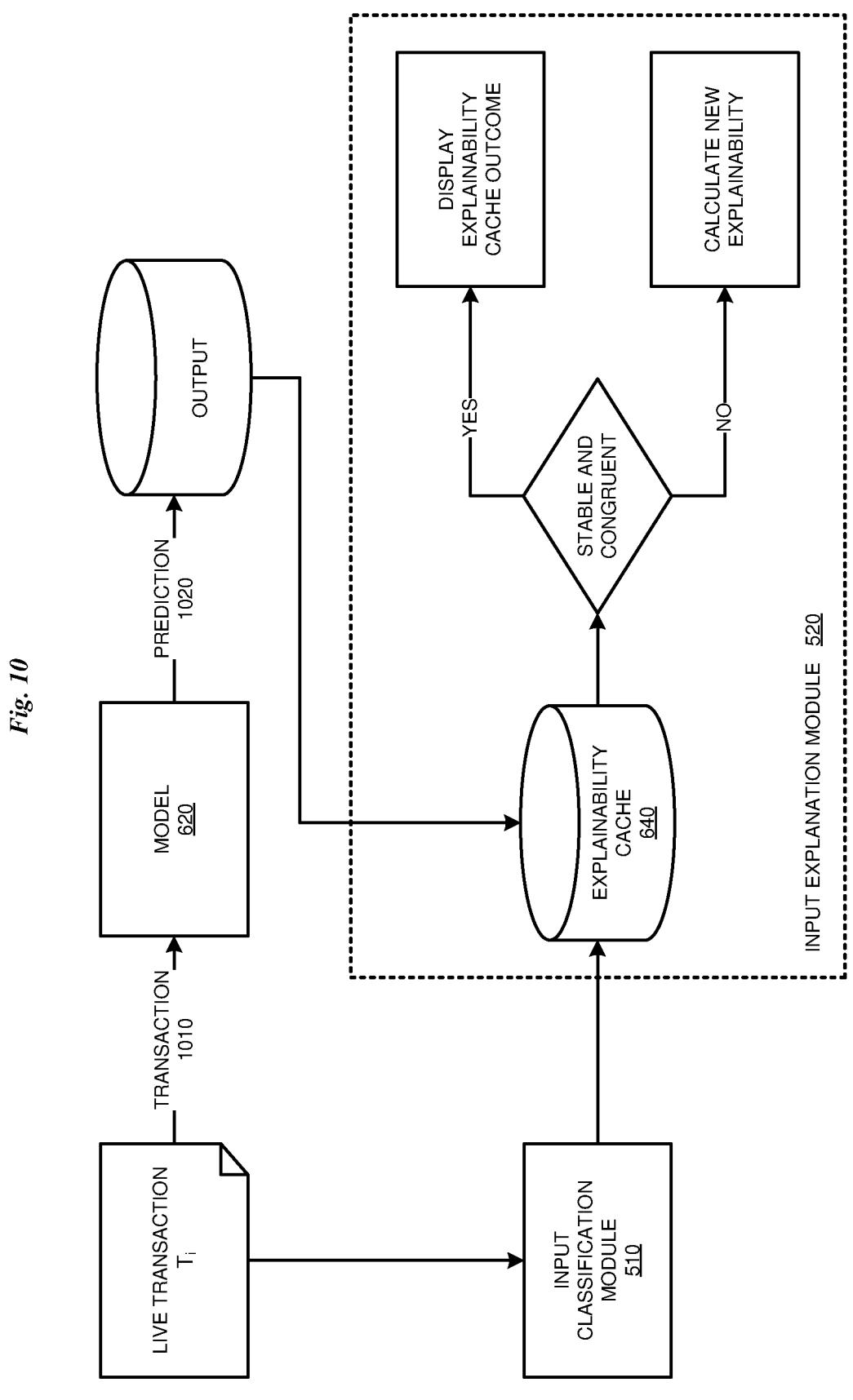
FIG. 10 depicts data flow of an example configuration for reducing computational requirements for machine learning model explainability in accordance with an illustrative embodiment.

With reference to FIG. 10, this figure depicts data flow of an example configuration for reducing computational requirements for machine learning model explainability in accordance with an illustrative embodiment. Model 620 and explainability cache 640 are the same as model 620 and explainability cache 640 in FIG. 6.

Model 620 is a machine learning model producing prediction 1020 from transaction 1010. Input classification module 510 determines which input space cluster transaction 1010 is most similar to within the input space. Using explainability cache 640, if the selected input cluster is labelled as unstable, input explanation module 520 uses an explainability model to explain prediction 920. If the selected input cluster is labelled as stable, module 520 compares prediction 920 with a result output of the explanation space cluster's interpretable model. If the two results are congruent, the interpretable model's explanation is valid and module 520 uses the explanation space's interpretable model to explain transaction 1010.

With reference to FIG. 11, this figure depicts a flowchart of an example process for reducing computational requirements for machine learning model explainability in accordance with an illustrative embodiment. Process 1100 can be implemented in application 300 in FIG. 3.

In block 1102, the application uses feature importance data produced by analyzing, using an explainability model, a set of training transactions, to determine a set of weighted explainability features comprising weights of contributions of an explainability feature in explaining a machine learning model prediction. In block 1104, the application groups the set of training transactions into a set of explainability space clusters according to the set of weighted set of explainability features. In block 1106, the application constructs, for each explainability space cluster, a corresponding interpretable model. In block 1108, the application constructs a set of input space clusters by clustering the set of training transactions according to values of the set of weighted explainability features in the set of training transactions. Then the application ends.

With reference to FIG. 12, this figure depicts a flowchart of an example process for reducing computational requirements for machine learning model explainability in accordance with an illustrative embodiment. Process 1200 can be implemented in application 300 in FIG. 3.

In block 1202, the application classifies a first input transaction into an input cluster. In block 1204, the application determines whether the first input space cluster maps to a single explainability space cluster. If yes ("YES" path of block 1204), in block 1206, the application determines whether a first machine learning model prediction resulting from processing, by the machine learning model, the second input transaction matches, within a threshold amount of similarity, a result provided by the interpretable model. If yes ("YES" path of block 1206), in block 1208 the application uses an interpretable model corresponding to the single explainability space cluster to explain the first machine learning model prediction, then ends. Otherwise ("NO" paths of block 1204 and 1206), in block 1210 the application uses the explainability model to explain the machine learning model prediction. In block 1212 the application updates explainability space clusters and decision explanation models, then ends.

Figure 13:
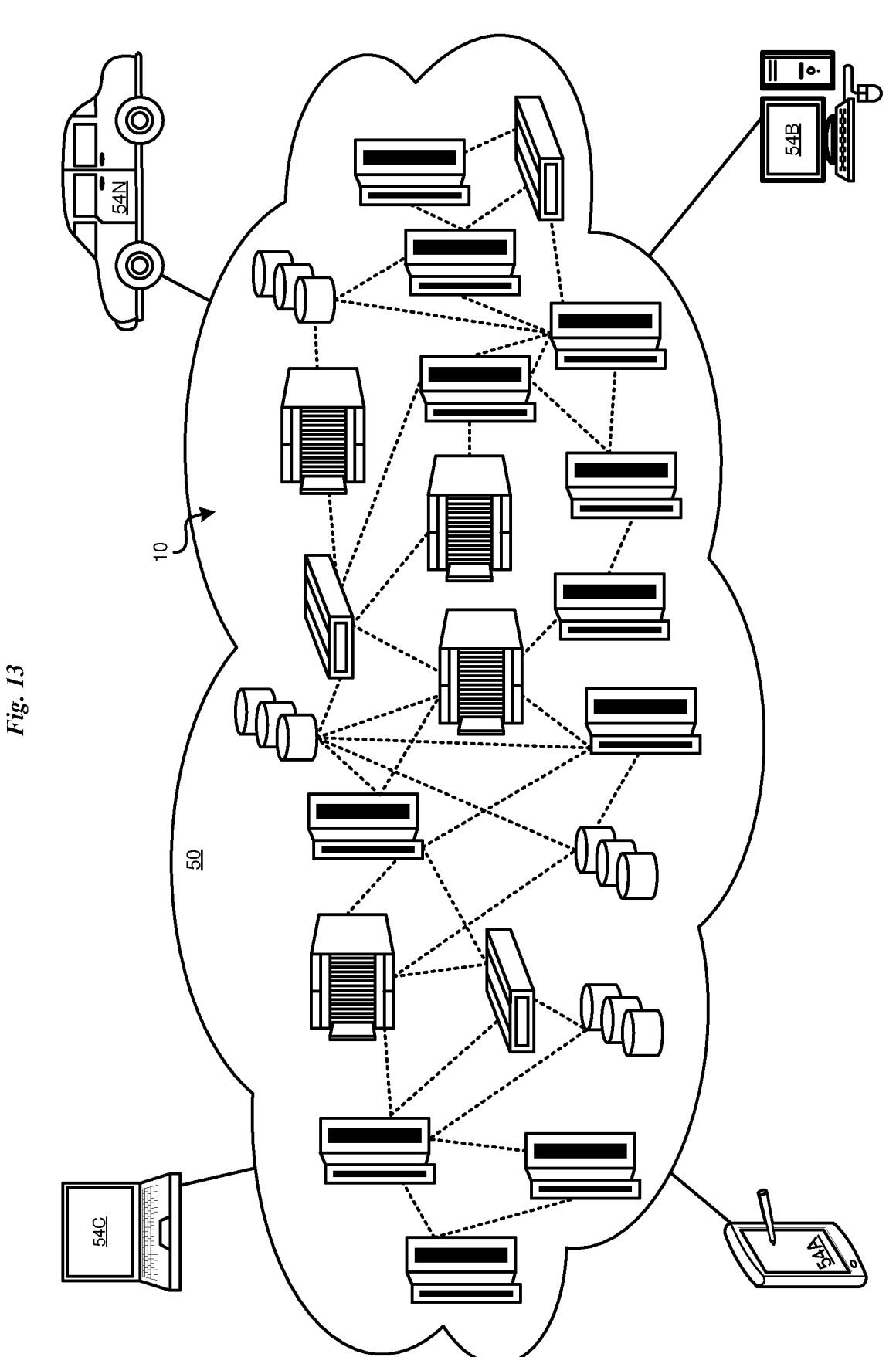
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 14:
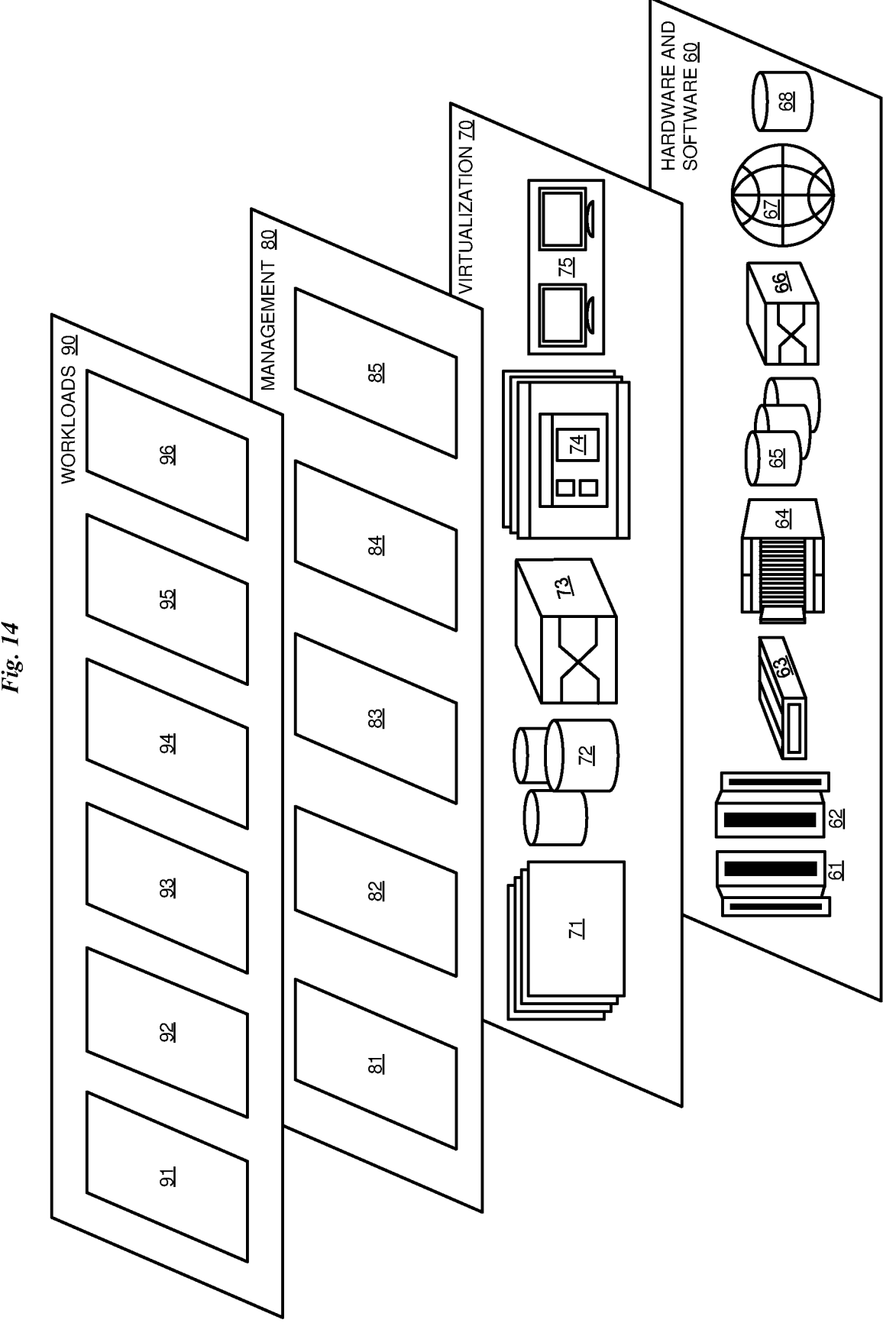
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for reducing computational requirements for machine learning model explainability and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:

outputting, from a machine learning model and responsive to processing a first input transaction, a first machine learning prediction;

classifying, into a first input space cluster in a set of input space clusters, the first input transaction, wherein the first input space cluster comprises a first set of member transactions in which each member transaction includes a first common set of weighted explainability features that is descriptive of the corresponding member transaction;

mapping the first input space cluster to a single explainability space cluster in a set of explainability space clusters, wherein each second member transaction in the single explainability space cluster includes a second common set of weighted explainability features that is descriptive of a common result produced from each second member transaction, and wherein the mapping is stable when there is a complete overlap between the first common set of weighted explainability features and the second common set of weighted explainability features; and generating, responsive to the mapping being stable, by executing a sequence of tests at a set of nodes in a decision tree of an interpretable model corresponding to the single explainability space cluster, an explanation output corresponding to the first machine learning model prediction, wherein a node in the set of nodes comprises a test on a corresponding weighted explainability feature, wherein a branch from the node comprises an outcome of the test, and wherein the sequence is constructed a path from a root node to a leaf node in the decision tree, the sequence of tests in the path producing the explanation output.

2. The computer-implemented method of claim 1, wherein the explaining is performed responsive to determining that the first machine learning model prediction matches, within a threshold amount of similarity, a result provided by the interpretable model.

3. The computer-implemented method of claim 1, further comprising:

classifying, into a second input space cluster in the set of input space clusters, a second input transaction;

determining that the second input space cluster maps to more than one explainability space cluster; and explaining, using an explainability model, a second machine learning model prediction, the second machine learning model prediction resulting from processing, by the machine learning model, the second input transaction.

4. The computer-implemented method of claim 1, further comprising:

determining, using feature importance data produced by using an explainability model to analyze a set of training transactions, a set of weighted explainability features, a weighted explainability feature in the set of weighted explainability features comprising a weight of a contribution of an explainability feature in explaining a machine learning model prediction, the machine learning model prediction resulting from processing, by the machine learning model, a training transaction in the set of training transactions;

grouping, into the set of explainability space clusters according to the weighted set of explainability features, the set of training transactions; and constructing, for each explainability space cluster in the set of explainability space clusters, a corresponding interpretable model.

5. The computer-implemented method of claim 4, further comprising:

constructing, by clustering the set of training transactions according to values of the set of weighted explainability features in the set of training transactions, the set of input space clusters.

6. The computer-implemented method of claim 4, wherein the weight of the contribution of the explainability feature in explaining the machine learning model prediction is above a threshold weight.

7. A computer program product for machine learning model explainability, the computer program product comprising:

one or more computer readable storage media, and program instructions collectively stored on the one or more computer readable storage media, the stored program instructions comprising:

program instructions to output, from a machine learning model and responsive to processing a first input transaction, a first machine learning prediction;

program instructions to classify, into a first input space cluster in a set of input space clusters, the first input transaction, wherein the first input space cluster comprises a first set of member transactions in which each member transaction includes a first common set of weighted explainability features that is descriptive of the corresponding member transaction;

program instructions to perform a mapping the first input space cluster to a single explainability space cluster in a set of explainability space clusters, wherein each second member transaction in the single explainability space cluster includes a second common set of weighted explainability features that is descriptive of a common result produced from each second member transaction, and wherein the mapping is stable when there is a complete overlap between the first common set of weighted explainability features and the second common set of weighted explainability features; and program instructions to generate, responsive to the mapping being stable, by executing a sequence of tests at a set of nodes in a decision tree of an interpretable model corresponding to the single explainability space cluster, an explanation output corresponding to the first machine learning model prediction, wherein a node in the set of nodes comprises a test on a corresponding weighted explainability feature, wherein a branch from the node comprises an outcome of the test, and wherein the sequence is constructed a path from a root node to a leaf node in the decision tree, the sequence of tests in the path producing the explanation output.

8. The computer program product of claim 7, wherein the explaining is performed responsive to determining that the first machine learning model prediction matches, within a threshold amount of similarity, a result provided by the interpretable model.

9. The computer program product of claim 7, the stored program instructions further comprising:

program instructions to classify, into a second input space cluster in the set of input space clusters, a second input transaction;

program instructions to determine that the second input space cluster maps to more than one explainability space cluster; and program instructions to explain, using an explainability model, a second machine learning model prediction, the second machine learning model prediction resulting from processing, by the machine learning model, the second input transaction.

10. The computer program product of claim 8, the stored program instructions further comprising:

program instructions to determine, using feature importance data produced by using an explainability model to analyze a set of training transactions, a set of weighted explainability features, a weighted explainability feature in the set of weighted explainability features comprising a weight of a contribution of an explainability feature in explaining a machine learning model prediction, the machine learning model prediction resulting from processing, by the machine learning model, a training transaction in the set of training transactions;

program instructions to group, into the set of explainability space clusters according to the weighted set of explainability features, the set of training transactions; and program instructions to construct, for each explainability space cluster in the set of explainability space clusters, a corresponding interpretable model.

11. The computer program product of claim 10, the stored program instructions further comprising:

program instructions to construct, by clustering the set of training transactions according to values of the set of weighted explainability features in the set of training transactions, the set of input space clusters.

12. The computer program product of claim 10, wherein the weight of the contribution of the explainability feature in explaining the machine learning model prediction is above a threshold weight.

13. The computer program product of claim 7, wherein the stored program instructions are stored in the at least one of the one or more storage media of a local data processing system, and wherein the stored program instructions are transferred over a network from a remote data processing system.

14. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

15. The computer program product of claim 7, wherein the computer program product is provided as a service in a cloud environment.

16. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to output, from a machine learning model and responsive to processing a first input transaction, a first machine learning prediction;

program instructions to classify, into a first input space cluster in a set of input space clusters, the first input transaction, wherein the first input space cluster comprises a first set of member transactions in which each member transaction includes a first common set of weighted explainability features that is descriptive of the corresponding member transaction;

program instructions to perform a mapping the first input space cluster to a single explainability space cluster in a set of explainability space clusters, wherein each second member transaction in the single explainability space cluster includes a second common set of weighted explainability features that is descriptive of a common result produced from each second member transaction, and wherein the mapping is stable when there is a complete overlap between the first common set of weighted explainability features and the second common set of weighted explainability features; and program instructions to generate, responsive to the mapping being stable, by executing a sequence of tests at a set of nodes in a decision tree of an interpretable model corresponding to the single explainability space cluster, an explanation output corresponding to the first machine learning model prediction, wherein a node in the set of nodes comprises a test on a corresponding weighted explainability feature, wherein a branch from the node comprises an outcome of the test, and wherein the sequence is constructed a path from a root node to a leaf node in the decision tree, the sequence of tests in the path producing the explanation output.

17. The computer system of claim 16, wherein the explaining is performed responsive to determining that the first machine learning model prediction matches, within a threshold amount of similarity, a result provided by the interpretable model.

18. The computer system of claim 16, the stored program instructions further comprising:

program instructions to classify, into a second input space cluster in the set of input space clusters, a second input transaction;

program instructions to determine that the second input space cluster maps to more than one explainability space cluster; and program instructions to explain, using an explainability model, a second machine learning model prediction, the second machine learning model prediction resulting from processing, by the machine learning model, the second input transaction.

* * * * *